United States Patent
Yu

(10) Patent No.: US 10,341,844 B2
(45) Date of Patent: Jul. 2, 2019

(54) METHOD AND APPARATUS FOR IMPLEMENTING VIRTUAL COMMUNICATION CARD

(71) Applicant: ZTE CORPORATION, Guangdong (CN)

(72) Inventor: Bing Yu, Guangdong (CN)

(73) Assignee: ZTE CORPORATION, Shenzhen (CN)

( * ) Notice: Subject to any disclaimer, the term of this patent is extended or adjusted under 35 U.S.C. 154(b) by 288 days.

(21) Appl. No.: 15/321,122

(22) PCT Filed: Sep. 17, 2014

(86) PCT No.: PCT/CN2014/086722
§ 371 (c)(1),
(2) Date: Dec. 21, 2016

(87) PCT Pub. No.: WO2015/196587
PCT Pub. Date: Dec. 30, 2015

(65) Prior Publication Data
US 2017/0142573 A1    May 18, 2017

(30) Foreign Application Priority Data
Jun. 24, 2014  (CN) .......................... 2014 1 0288732

(51) Int. Cl.
*H04W 8/18*    (2009.01)
*H04W 8/20*    (2009.01)
(Continued)

(52) U.S. Cl.
CPC ........... *H04W 8/20* (2013.01); *H04L 12/4641* (2013.01); *H04W 8/18* (2013.01); *H04W 48/14* (2013.01)

(58) Field of Classification Search
CPC ......... H04W 8/18; H04W 48/14; H04W 8/20; G06Q 20/351; G06Q 20/341;
(Continued)

(56) References Cited

U.S. PATENT DOCUMENTS

2011/0307377 A1* 12/2011 Nelsen ................. G06Q 20/105
705/41

FOREIGN PATENT DOCUMENTS

| CN | 101222712 A | 7/2008 |
| CN | 102264061 A | 11/2011 |
| CN | 102917338 A | 2/2013 |

OTHER PUBLICATIONS

International Search Report for Application No. PCT/CN2014/086722, dated Mar. 30, 2015.

* cited by examiner

*Primary Examiner* — Nizar N Sivji
(74) *Attorney, Agent, or Firm* — Marshall, Gerstein & Borun LLP

(57) ABSTRACT

A method for implementing a virtual communication card is provided. The method is applied to a terminal device and includes: resolving a data file prestored locally to obtain communication card information carried in the data file; loading the data file when the data file is determined to be matched with communication card information to be used according to the communication card information; and activating the data file to be used as a virtual communication card when the data file is determined to be in an unregistered state. An apparatus for implementing a virtual communication card is further provided.

9 Claims, 4 Drawing Sheets

(51) Int. Cl.
*H04L 12/46* (2006.01)
*H04W 48/14* (2009.01)

(58) Field of Classification Search
CPC ............. G06Q 20/352; G06Q 20/3576; G06Q 20/388; H04L 12/4641; H04L 63/0853; H04L 63/0869; G06F 21/34; G06F 2221/2153
See application file for complete search history.

METHOD AND APPARATUS FOR IMPLEMENTING VIRTUAL COMMUNICATION CARD

TECHNICAL FIELD

The present disclosure relates to the field of wireless communication technology, in particular to a method and an apparatus for implementing a virtual communication card.

BACKGROUND

When implementing technical solutions of embodiments of the present application, the inventors find that at least the following technical problems exist in the related art.

With a rapid development of the communication technology, performances and configuration of terminal devices, such as a mobile phone, are getting better. For example, memory capacity becomes larger, screens become bigger, and thickness thereof becomes thinner. At the same time, more and more functions, such as document processing, multimedia processing and transmission of various data, are supported by the terminal devices, causing better operability and user experience of the terminal devices, thus the terminal devices are more popular with the users. Consequently, more hardware circuits are required. However, terminal devices with a slim design and a large battery capacity are demanded on the current market, which causes a space occupied by printed circuit boards (PCB) of a mobile phone itself smaller. On one hand, a large number of hardware circuits are required, while on the other hand, the space occupied by the PCB needs to be smaller, which contradict with each other. Therefore, methods for simplifying device layout of the PCB need to be found.

For current terminal devices, the layout space of the hardware circuit is limited by system solutions and size of chips, and is substantially constant. In addition, the main space on the PCB of a terminal device is occupied by various connectors, in which card holders of communication cards of the terminal device occupy the largest space. Therefore, the space on the PCB may be saved by omitting the card holders of the communication cards including a communication card for implementing wireless communication function, such as a user identify module (UIM)/subscriber identity module (SIM).

For a part of existing terminal devices customized by operators, the wireless communication function may be implemented via a number writing function without a UIM/SIM card holder. However, customized terminal devices are limited by fixed numbers or operator customization, and hence flexible switching similar to traditional communication cards cannot be implemented.

However, with respect to the above problems, no effective solution exists in the related art.

SUMMARY

In view of this, embodiments of the present invention intend to provide a method and an apparatus for implementing a virtual communication card, so that a terminal device can realize a wireless communication function without card holders for communication cards and realize a flexible switching similar to traditional communication cards.

The technical solutions of the embodiments of the present invention are implemented as below.

An embodiment of the present invention provides a method for implementing a virtual communication card, being applied to a terminal device and including: resolving a data file prestored locally to obtain communication card information carried in the data file; loading the data file when the data file is determined to be matched communication card information to be used according to the communication card information; and activating the data file to be used as a virtual communication card when the data file is determined to be in an unregistered state.

In the above solution, before the step of resolving a data file prestored locally to obtain communication card information carried in the data file, the method further includes: acquiring a resolution key corresponding to a data file to be resolved; and the step of resolving a data file prestored locally to obtain communication card information carried in the data file includes: resolving the data file prestored locally via the resolution key to obtain the communication card information carried in the data file.

In the above solution, the method further includes: checking the data file via the resolution key to determine validity of the communication card information carried in the data file, and resolving additional information carried in the data file according to the resolution key.

In the above solution, after the step of loading the data file, the method further includes: sending a registration request carrying the communication card information of the data file; and determining that the data file is in the unregistered state after receiving a successful response to the registration request.

In the above solution, before the step of sending a registration request carrying the communication card information of the data file, the method further includes: in the case that it is determined that there exists a loaded data file, comparing the data file with the loaded data file, and sending the registration request carrying the communication card information of the data file when it is determined that the data file and the loaded data file are of different types.

An embodiment of the present invention further provides an apparatus for implementing a virtual communication card, being provided in a terminal device and including a hardware processor which is configured with a resolving module, a loading module and an activating module. The resolving module is configured to resolve a data file prestored locally to obtain communication card information carried in the data file. The loading module is configured to load the data file when the data file is determined to be matched with communication card information to be used according to the communication card information. The activating module is configured to activate the data file to be used as a virtual communication card when the data file is determined to be in an unregistered state.

In the above solution, the hardware processor is further configured with: a key module, configured to acquire a resolution key corresponding to a data file to be resolved; and the resolving module is specifically configured to resolve the data file prestored locally via the resolution key to obtain the communication card information carried in the data file.

In the above solution, the hardware processor is further configured with: an additional module, configured to check the data file via the resolution key to determine validity of the communication card information carried in the data file, and resolve additional information carried in the data file according to the resolution key.

In the above solution, the hardware processor is further configured with: a registering module, configured to send a registration request carrying the communication card information of the data file, and determine that the data file is in an unregistered state after receiving a successful response to the registration request.

In the above solution, the registering module is further configured to: in the case that it is determined that there exists a loaded data file, compare the data file with the loaded data file, and send the registration request carrying the communication card information of the data file when it is determined that the data file and the loaded data file are of different types.

During the process, the resolving module, the loading module, the activating module, the key module, the additional module and the registering module may be implemented via a central processing unit (CPU), a Digital Signal Processor (DSP) or a Field-Programmable Gate Array (FPGA).

An embodiment of the present invention further provides a non-transitory computer-readable storage medium storing instructions which, when executed by a processor, cause the processor to perform a method comprising: resolving a data file prestored locally to obtain communication card information carried in the data file; loading the data file when the data file is determined to be matched with communication card information to be used according to the communication card information; and activating the data file to be used as a virtual communication card when the data file is determined to be in an unregistered state.

According to the method and apparatus for implementing a virtual communication card provided by the embodiments of the present invention, a data file prestored locally is resolved to obtain communication card information carried in the data file, the data file is loaded when the data file is determined to be matched with communication card information to be used according to the communication card information, and the data file is activated to be used as a virtual communication card when the data file is determined to be in an unregistered state. As can be seen, the traditional physical communication card may be replaced by a virtual communication card, the space on a PCB may be saved by omitting card holders of communication cards, and hence the cost of hardware may be saved. Moreover, with the support of software, it is convenient to flexibly switch the communication cards on the terminal.

DETAILED DESCRIPTION

In the embodiments of the present invention, a data file prestored locally is resolved to obtain communication card information carried in the data file. The data file is loaded when it is determined that the data file matches with communication card information to be used according to the obtained communication card information, and the data file is activated to be used as a virtual communication card when the data file is determined to be in an unregistered state.

The present disclosure will be further illustrated in details below in conjunction with the drawings and specific embodiments.

Figure 1:
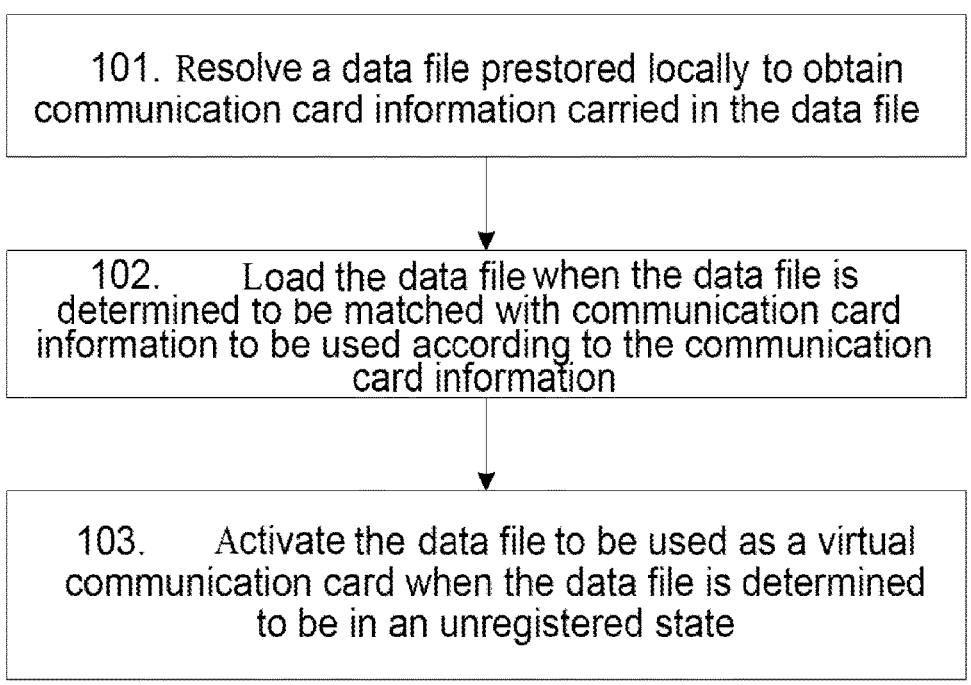
FIG. 1 is a schematic flow chart of a method for implementing a virtual communication card according to an embodiment of the present invention.

FIG. 1 shows a method for implementing a virtual communication card according to an embodiment of the present invention, which is applied to a terminal. As shown in FIG. 1, the method includes steps as described below.

In step 101, a data file prestored locally is resolved to obtain communication card information carried in the data file.

Specifically, a data file prestored in a local terminal device is resolved by the terminal device, so as to obtain communication card information carried in the resolved data file. The communication card information carried in the data file includes all the information carried in a traditional communication card, for example, information such as Authentication Key, Electronic Serial Number (ESN) and International Mobile Subscriber Identity (IMSI), etc.

Before resolving the data file prestored locally to obtain the communication card information carried in the data file, a resolution key corresponding to the file to be resolved is acquired, and the data file prestored locally is resolved via the resolution key to obtain the communication card information carried in the data file.

Here, the data file prestored in the terminal device may be an encrypted data file. When the data file is resolved by the terminal device, the resolution key corresponding to the data file needs to be acquired, so as to decode and resolve the data file. Different modes for acquiring the resolution key corresponding to the data file may be employed according to practical situations. For example, in the case that a user knows the resolution key of the data file, the user may be notified to input the resolution key of the data file, and the resolution key input by the user is acquired, then the data file is decrypted and resolved via the resolution key. In the case that the resolution key of the data file is stored in the terminal device per se, the resolution key corresponding to the data file may be obtained by querying. After the resolution key is acquired, the data file may be decrypted and resolved via the resolution key. Here, in the embodiment of the present invention, a relationship between the key and the data file is not limited, and resolution keys corresponding to the data files one by one may be obtained by performing calculation on the data files with any algorithm.

It should be noted that, a plurality of data files may be prestored in the terminal device, and each data file and its corresponding resolution key may be provided by telecommunication operators, virtual telecommunication operators or terminal device manufactures.

Here, the data file is checked via the resolution key to determine validity of the communication card information carried in the data file, and additional information carried in the data file is resolved according to the resolution key.

After resolving the data file, the terminal device verifies the validity of the communication card information resolved via the resolution key, so as to verify whether the communication card information carried in the data file is valid communication card information. When it is determined that the communication card information carried in the data file is valid, the data file is determined as a valid data file. It should be noted that, the verification of the validity of the communication card information carried in the data file is equivalent to a detection process of hot plug of a traditional communication card.

When it is determined that the communication card information carried in the data file is valid, the additional information of the data file is resolved. The additional information may include additional information such as an address book, and is equivalent to some additional information stored in the traditional communication card during the use of the traditional communication card. The data file does not include additional information when it is used for the first time, and may include additional information added during the first use when it is used again. When the data file is used as a virtual communication card, the additional information may be added, deleted and updated, etc., according to operations of the user.

In step 102, the data file is loaded if it is determined that the data file matches with communication card information to be used according to the communication card information.

Here, after resolving the data file and obtaining the communication card information carried in the data file, the terminal device determines whether the data file is to be loaded based on the communication card information obtained. Specifically, the communication card information obtained is compared with communication card information to be used that is input by the user. If the communication card information obtained is consistent with the communication card information to be used that is input by the user, the two are determined to be matched with each other, and the data file is loaded; otherwise, the data file is not loaded. When the communication card information obtained is compared with the communication card information to be used, International Mobile Subscriber Identity in the communication card information obtained may be compared with IMSI in the communication card information to be used. Here, the IMSI in the communication card information to be used may be input by the user directly, or it may be calculated from a telephone number input by the user.

In step 103, the data file is activated to be used as a virtual communication card when it is determined to be in an unregistered state.

Specifically, after loading the data file, the terminal device sends a registration request carrying the communication card information of the data file. After a successful response to the registration request being received, the data file is determined to be in an unregistered state, and at this point, the data file is activated to be used as a virtual communication card.

Here, if it can be determined that there exists loaded data files before sending the registration request carrying the communication card information of the data file, the data file is compared with the loaded data files. If it is determined that the data file and the loaded data files are of different types, a registration request carrying the communication card information of the data file will be sent. Specifically, when the terminal device does not employ a specific data file determined to be loaded according to the communication card information input by the user, it may be determined whether to load the data file by the terminal device according to the type of the data file. For example, the type of a current data file is Unicom 3G, when the loaded data files include a data file the type of which is Unicom 3G (The 3rd Generation Telecommunication), the data files loaded currently will not be replaced, and no registration request carrying the communication card information of the data file will be sent; when the loaded data files include no data file the type of which is Unicom 3G, the data files loaded currently will be replaced, and a registration request carrying the communication card information of the data file will be sent. The data files are classified according to the classification of the communication cards by an actual operator.

It should be noted that, the method according to the embodiment of the present invention may be implemented via a management module in the terminal device, and actions such as resolving, matching, loading and activating, etc., are performed on the data file by the management module of the terminal device. Moreover, when there exists a user input, the user input may be received via the management module.

Figure 2:
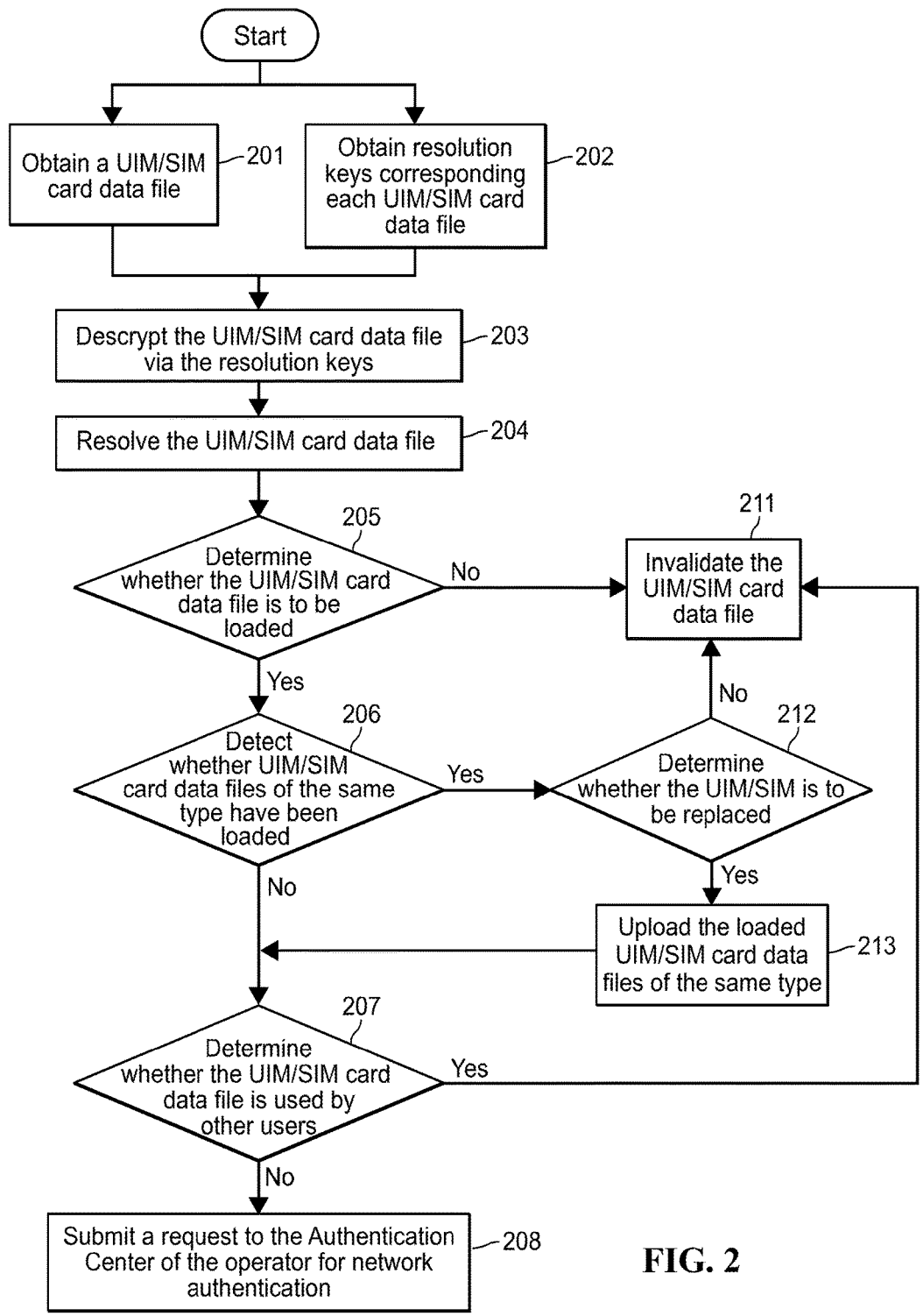
FIG. 2 is a schematic flow chart showing a specific example of a method for implementing a virtual communication card.

FIG. 2 is a schematic flow chart showing a specific example of a method for implementing a virtual communication card. Here, the method according to the embodiment of the present invention will be illustrated by an example in which the communication card is a UIM/SIM card, the data file is a corresponding UIM/SIM card data file and the terminal device is a mobile phone. As shown in FIG. 2, the method includes steps as described below.

In step 201, a UIM/SIM card data file is obtained.

Specifically, a UIM/SIM card data file corresponding to a traditional physical UIM/SIM card is obtained, and the UIM/SIM card data file may be used as a virtual UIM/SIM card. Here, as shown in FIG. 3, a plurality of UIM/SIM card data files such as data file 1, data file 2, . . . , data file n, etc., may be stored in a mobile phone in a manner of T-flash (TF) card access or Universal Serial Bus (USB) access.

Figure 3:
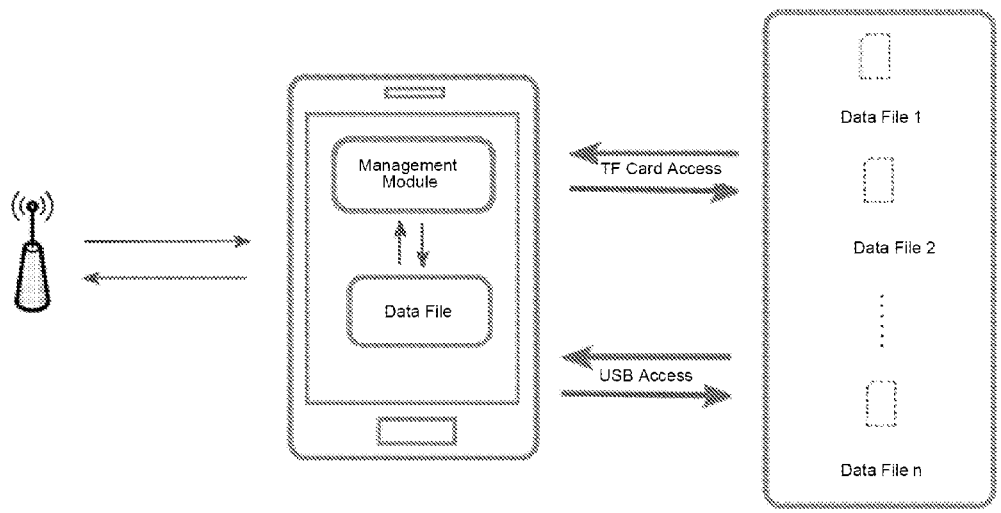
FIG. 3 shows a specific application scene of a method for implementing a virtual communication card according to an embodiment of the present invention.

It should be noted that, in FIG. 3, the mobile phone resolves the data file via a management module, and then realizes the functions of network search and communication, etc., via a base station according to the same flow as a physical card.

In step 202, resolution keys corresponding to each UIM/SIM card data file are obtained.

In step 203, the UIM/SIM card data file is decrypted via the resolution key.

The UIM/SIM card data file is decrypted via the resolution key, and protection on the information carried in the data file is released.

In step 204, the UIM/SIM card data file is resolved.

The mobile phone resolves the decrypted UIM/SIM card data file to obtain the communication card information. The communication card information contains Authentication Key, ESN, IMSI and the like.

Here, when decrypting and resolving the UIM/SIM card data files, the mobile phone may select one or more UIM/SIM card data files for decrypting and resolving according to file names of the UIM/SIM card data files, where, the selected UIM/SIM card data file is the UIM/SIM card data file to be used.

In step 205, it is determined whether the UIM/SIM card data file is to be loaded.

Specifically, the validity of the UIM/SIM card data file is verified according to the resolution key. If it is determined that the UIM/SIM card data file is valid, the UIM/SIM card data file will be loaded, and the process turns to step 206; otherwise, the process turns to step 211, the UIM/SIM card data file is invalidated, that is, the UIM/SIM card data file is labelled as an invalid UIM/SIM card data file. After the UIM/SIM card data file being loaded, the communication card information of the UIM/SIM card data file is displayed on a user interface for managing loaded UIM/SIM card data file, so that a user may intuitively view the UIM/SIM card data file loaded currently.

In step 206, it is detected whether UIM/SIM card data files of the same type have been loaded.

Here, it is detected whether there exists a loaded UIM/SIM card data file besides the UIM/SIM card data file loaded in step 205 in the mobile phone. If the detection result is yes, it is determined whether the UIM/SIM card data file loaded in step 205 and the loaded UIM/SIM card data file are of the same type. Specifically, when they are of the same type, the process turns to step 212 to determine whether the UIM/SIM card data file is to be replaced. Here, the user may be notified to determine whether the loaded UIM/SIM card data file is to be replaced. If the user selects not to replace the loaded UIM/SIM card data file, the process turns to step 211. If the user selects to replace the loaded UIM/SIM card data file, the process turns to step 213, and the loaded UIM/SIM card data file of the same type is unloaded. When they are of different types, the process turns to step 207. The UIM/SIM card data file loaded in step 205 and the loaded UIM/SIM card data file being of different types may include two situations: 1) there exists no loaded UIM/SIM card data file; 2) there exists loaded UIM/SIM card data files, but the type of existing loaded UIM/SIM card data file is inconsistent with that of the UIM/SIM card data file loaded in step 205.

In step 207, it is determined whether the UIM/SIM card data file is used by other users.

Specifically, the terminal device sends a registration request carrying the communication card information of the data file to request to the operator, so as to detect whether the virtual UIM/SIM card has been registered. After receiving a successful response to the registration request, the UIM/SIM card data file is determined to be in an unregistered state and is not used by other users, and at this point, the process turns to step 208 to submit a request to the Authentication Center (AUC) of the operator for network authentication. If no successful response to the registration request is received, it indicates that the virtual UIM/SIM card has been used by other mobile phone users, and the process turns to step 211.

Figure 4:
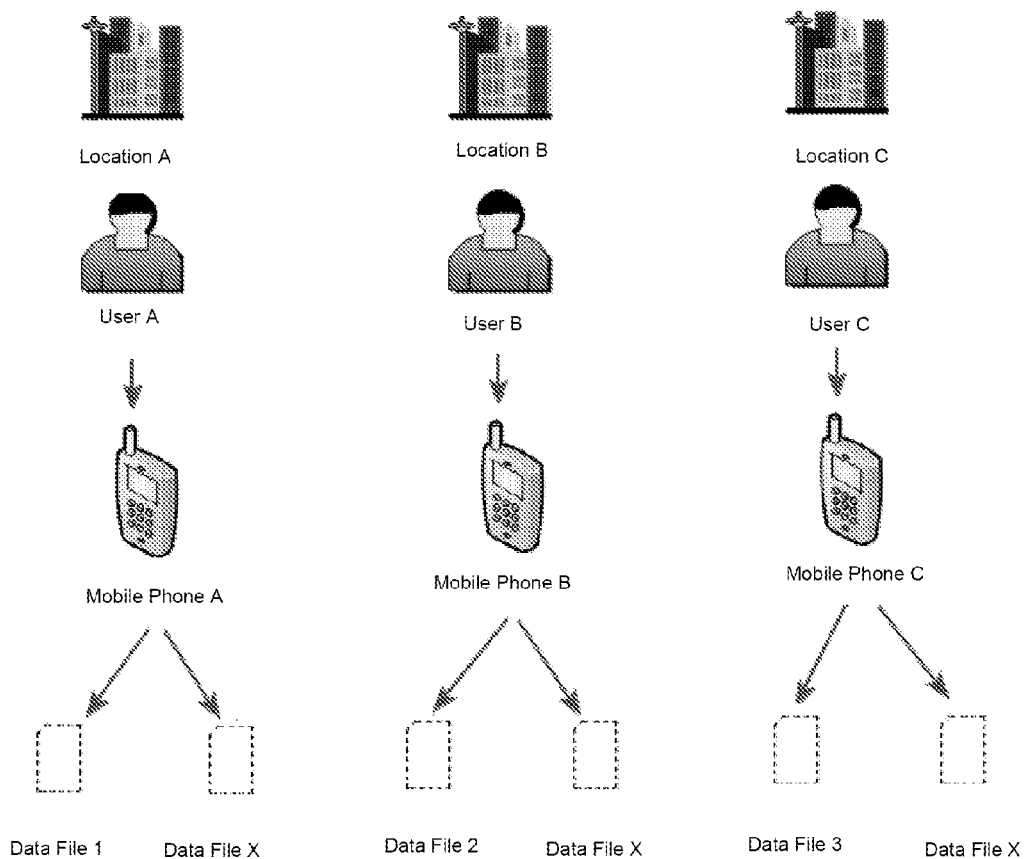
FIG. 4 shows another specific application scene of a method for implementing a virtual communication card according to an embodiment of the present invention.

FIG. 4 shows another specific application scene of a method for implementing a virtual communication card according to the embodiment of the present invention. As shown in FIG. 4, the same UIM/SIM card data file (data file x) is switched among different mobile phones, for example, mobile phone A, mobile phone B and mobile phone C, and the mobile phone A belongs to user A located at location A, the mobile phone B belongs to user B located at location B, and the mobile phone C belongs to user C located at location C. A plurality of different data files may be prestored in each mobile phone simultaneously, for example, data file 1 and data file X are prestored in mobile phone A, data file 2 and data file X are prestored in mobile phone B, and data file 3 and data file X are prestored in mobile phone C. The same UIM/SIM card data file may be simultaneously saved in different mobile phones of the user and the family members thereof. When required, the UIM/SIM card data file of a user may be logged out, and such UIM/SIM card data file of another user may be activated, so that a flexible switching of the same virtual UIM/SIM card between different mobile phones may be realized.

A terminal device adopting the method for implementing a virtual communication card according to the embodiment of the present invention has the following features when being in use:

1) No card holder of communication cards exists in the hardware of the terminal device;

2) Information of the terminal device, such as the communication card, is solidified in a readable storage space of a virtual UIM/SIM card data file;

3) The communication card is not bound to the software version of the terminal device, and a user may arbitrarily replace and use different virtual communication card data files that conform to the operator criteria; and 4) No card holder interface for communication cards exists in the hardware of the terminal device, thereby occupying no PCB layout space and reducing the materiel cost, which adapts to a development trend of slim of the whole terminal device and is beneficial to improve the structural reliability of the terminal device.

Figure 5:
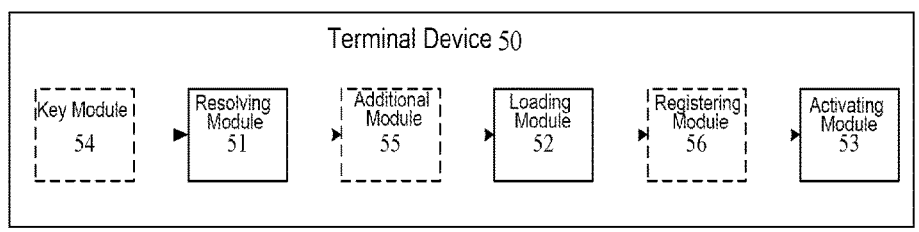
FIG. 5 is a schematic structural diagram of an apparatus for implementing a virtual communication card according to an embodiment of the present invention.

In order to implement the above method, an embodiment of the present invention further provides an apparatus for implementing a virtual communication card, as shown in FIG. 5. The apparatus is provided in a terminal device 50, and includes a resolving module 51, a loading module 52 and an activating module 53.

The resolving module 51 is configured to resolve a data file prestored locally to obtain communication card information carried in the data file.

The loading module 52 is configured to load the data file when the data file is determined to be matched with communication card information to be used according to the communication card information.

The activating module 53 is configured to activate the data file to be used as a virtual communication card when the data file is determined to be in an unregistered state.

As shown in FIG. 5, the apparatus further includes: a key module 54, configured to acquire a resolution key corresponding to the resolved file. Accordingly, the resolving module 51 is specifically configured to resolve the data file prestored locally via the resolution key to obtain the communication card information carried in the data file.

As shown in FIG. 5, the apparatus further includes: an additional module 55, configured to check the data file via the resolution key to determine the validity of the communication card information carried in the data file, and resolve additional information carried in the data file according to the resolution key.

As shown in FIG. 5, the apparatus further includes: a registering module 56, configured to send a registration request carrying the communication card information of the data file, and determine that the data file is in an unregistered state after receiving a successful response to the registration request.

Here, the registering module 56 is further configured to: in the case that it is determined that there exists a loaded data file, compare the data file with the loaded data file, and send the registration request carrying the communication card information of the data file when it is determined that the data file and the loaded data file are of different types.

In practical application, the apparatus or the system apparatus according to the present disclosure may be an independent system, or may be an existing terminal (such as a mobile phone) in which logic units for accomplishing different functions are added.

When the logic units are added to a mobile phone, the resolving module 51, the loading module 52, the activating module 53, the key module 54, the additional module 55 and the registering module 56 may be implemented by a Central Processing Unit (CPU), a Digital Signal Processor (DSP) or a Field Programmable Gate Array (FPGA) located in the mobile phone.

The above description only shows some embodiments of the present invention, rather than limiting the protection scope of the present disclosure.

INDUSTRIAL APPLICABILITY

According to the method and apparatus for implementing a virtual communication card according to the embodiments of the present invention, a data file prestored locally is resolved to obtain the communication card information carried in the data file, the data file is loaded when the data file is determined to be matched with the communication card information to be used according to the communication card information, and the data file is activated to be used as a virtual communication card when the data file is determined to be in an unregistered state, thereby the traditional physical communication card may be replaced by the virtual communication card, the space on a PCB may be saved by omitting the communication card holder, and hence the cost of hardware may be saved. Moreover, with the support of software, it is convenient to flexibly switch the communication cards on the terminal.

What is claimed is:

1. A method for implementing a virtual communication card, being applied to a terminal device and comprising:
    resolving a data file prestored locally to obtain communication card information carried in the data file;
    loading the data file when the communication card information obtained from the data file is determined to be matched with communication card information to be used that is input by a user; and
    when the data file is determined to be in an unregistered state, activating the data file so that the data file is used as a virtual communication card, wherein the communication card information obtain from the data file is communication card information of the virtual communication card;
    wherein after the step of loading the data file, the method further comprises:
    sending a registration request carrying the communication card information obtained from the data file; and
    determining that the data file is in an unregistered state after receiving a successful response to the registration request;
    wherein the sending the registration request carrying the communication card information obtained from the data file comprises:
    in the case that it is determined that there exists a loaded data file, comparing the data file with the loaded data file, and sending the registration request carrying the communication card information obtained from the data file when it is determined that the data file and the loaded data file are of different types.

2. The method according to claim 1, wherein before the step of resolving a data file prestored locally to obtain communication card information carried in the data file, the method further comprises:
    acquiring a resolution key corresponding to the data file to be resolved; and
    the step of resolving a data file prestored locally to obtain communication card information carried in the data file comprises:
    resolving the data file prestored locally via the resolution key to obtain the communication card information carried in the data file.

3. The method according to claim 2, further comprising:
    checking the data file via the resolution key to determine validity of the communication card information carried in the data file, and resolving additional information carried in the data file according to the resolution key.

4. An apparatus for implementing a virtual communication card, being provided in a terminal device, and comprising a hardware processor and a storage device, wherein the storage device is configured to store a resolving module, a loading module, an activating module and a registering module, which are executable by the hardware processor; wherein
    the resolving module is configured to resolve a data file prestored locally to obtain communication card information carried in the data file;
    the loading module is configured to load the data file when the communication card information obtained from the data file is determined to be matched with communication card information to be used that is input by a user; and
    the activating module is configured to: when the data file is determined to be in an unregistered state by the registering module, activate the data file so that the data file is used as a virtual communication card, wherein the communication card information obtained from the data file is communication card information of the virtual communication card;
    the registering module is configured to send a registration request carrying the communication card information obtained from the data file, and determine that the data file is in an unregistered state after receiving a successful response to the registration request; and
    the registering module is further configured to: in the case that it is determined that there exists a loaded data file, compare the data file with the loaded data file, and send the registration request carrying the communication card information obtained from the data file when it is determined that the data file and the loaded data file are of different types.

5. The apparatus according to claim 4, wherein the storage device is further configured to store a key module executable by the hardware processor, the key module is configured to acquire a resolution key corresponding to the data file to be resolved, and
    the resolving module is configured to resolve the data file prestored locally via the resolution key to obtain the communication card information carried in the data file.

6. The apparatus according to claim 5, wherein the storage device is further configured to store an additional module executable by the hardware processor, the additional module is configured to check the data file via the resolution key to determine validity of the communication card information carried in the data file, and resolve additional information carried in the data file according to the resolution key.

7. A non-transitory computer-readable storage medium storing instructions which, when executed by a processor, cause the processor to perform a method comprising:
    resolving a data file prestored locally to obtain communication card information carried in the data file;
    loading the data file when the communication card information obtained from the data file is determined to be matched with communication card information to be used that is input by a user; and
    when the data file is determined to be in an unregistered state, activating the data file so that the data file is used as a virtual communication card, wherein the communication card information obtain from the data file is communication card information of the virtual communication card;
    wherein after the step of loading the data file, the method further comprises:
    sending a registration request carrying the communication card information obtained from the data file; and determining that the data file is in an unregistered state after receiving a successful response to the registration request;

wherein the sending the registration request carrying the communication card information obtained from the data file comprises:

in the case that it is determined that there exists a loaded data file, comparing the data file with the loaded data file, and sending the registration request carrying the communication card information obtained from the data file when it is determined that the data file and the loaded data file are of different types.

8. The non-transitory computer-readable storage medium according to claim 7, wherein before the step of resolving a data file prestored locally to obtain communication card information carried in the data file, the method further comprises:

acquiring a resolution key corresponding to the data file to be resolved; and the step of resolving a data file prestored locally to obtain communication card information carried in the data file comprises:

resolving the data file prestored locally via the resolution key to obtain the communication card information carried in the data file.

9. The non-transitory computer-readable storage medium according to claim 8, wherein the method further comprising:

checking the data file via the resolution key to determine validity of the communication card information carried in the data file, and resolving additional information carried in the data file according to the resolution key.

* * * * *